United States Patent
Liu et al.

(10) Patent No.: US 8,415,840 B2
(45) Date of Patent: Apr. 9, 2013

(54) PLASTIC PACKAGE MOTOR

(75) Inventors: Xiang Liu, Zhongshan (CN); Ping Lu, Zhongshan (CN); Shuangchao Deng, Zhongshan (CN); Xiongcheng Wang, Zhongshan (CN)

(73) Assignee: Zhongshan Broad-Ocean Motor Manufacturing Co. Ltd., Zhongshan (CN)

( * ) Notice: Subject to any disclaimer, the term of this patent is extended or adjusted under 35 U.S.C. 154(b) by 433 days.

(21) Appl. No.: 12/876,149

(22) Filed: Sep. 5, 2010

(65) Prior Publication Data

US 2011/0210630 A1 Sep. 1, 2011

(30) Foreign Application Priority Data

Mar. 1, 2010 (CN) .................... 2010 2 0126848 U

(51) Int. Cl.
*H02K 5/02* (2006.01)
*H02K 5/167* (2006.01)

(52) U.S. Cl.
USPC ................................ 310/43; 310/90; 310/401

(58) Field of Classification Search .................... 310/43, 310/90, 401
See application file for complete search history.

(56) References Cited

U.S. PATENT DOCUMENTS

| | | | | | |
|---|---|---|---|---|---|
| 2,731,575 | A | * | 1/1956 | Hershberger | 310/90 |
| 3,041,976 | A | * | 7/1962 | Maynard | 417/357 |
| 3,720,914 | A | * | 3/1973 | Hallerback | 310/43 |
| 2008/0179979 | A1 | * | 7/2008 | Nolley | 310/89 |
| 2011/0210630 | A1 | * | 9/2011 | Liu et al. | 310/90 |

FOREIGN PATENT DOCUMENTS

JP 56049645 A * 5/1981

* cited by examiner

*Primary Examiner* — Tran Nguyen
*Assistant Examiner* — David Scheuermann
(74) *Attorney, Agent, or Firm* — Matthias Scholl P.C.; Matthias Scholl

(57) ABSTRACT

A plastic package motor, including at least a plastic package stator (1) including at least a stator core, a stator winding, and a housing, a rotor (2), a rotating shaft (3), a bearing (4), and at least one end cover. The stator winding is wrapped on the stator core. The housing is disposed outside the stator core and the stator winding, and is made of resin. The rotor (2) is disposed in a cavity (5) of the housing. A bearing housing (9) is disposed at the center of the end cover and operates to receive the bearing (4). The bearing (4) operates to support the rotating shaft (3). A flanging (8) axially protrudes from an outer edge of the end cover. The flanging (8) is received in the cavity (5) and is fit with inner wall of the cavity (5) whereby implementing radial locating, and causing the bearing housing (9) of the end cover to partially enter the cavity (5).

7 Claims, 5 Drawing Sheets

PLASTIC PACKAGE MOTOR

CROSS-REFERENCE TO RELATED APPLICATIONS

Pursuant to 35 U.S.C. §119 and the Paris Convention Treaty, this application claims the benefit of Chinese Patent Application No. 201020126848.6 filed on Mar. 1, 2010, the contents of which are incorporated herein by reference.

BACKGROUND OF THE INVENTION

1. Field of the Invention

The invention relates to a plastic package motor.

2. Description of the Related Art

Nowadays, most plastic package motors each comprises an independent end cover, a plastic package stator integrating another end cover, a rotor, a rotating shaft, and multiple rolling bearings. The independent end cover is mounted at a junction on one end of the plastic package stator via a self-tapping screw. A pair of bearing housings of the end cover protrudes from end surface of the plastic package stator, and a distance between the bearing housings is comparatively far. Therefore, accuracy of concentricity between rolling bearings in the bearing housing of the motor is not high enough, and this problem is still unsolved.

SUMMARY OF THE INVENTION

In view of the above-described problem, it is one objective of the invention to provide a plastic package motor that is capable of addressing the above-mentioned problems, features contact structure and accurate locating during assembly, and capable of effectively reducing a distance between two bearing housings on both ends of the motor, and improving accuracy of concentricity between rolling bearings in the bearing housing.

To achieve the above objectives, in accordance with one embodiment of the invention, provided is a plastic package motor, comprising a plastic package stator comprising a stator core, a stator winding, and a housing, a rotor, a rotating shaft, a bearing, and at least one end cover. The stator winding is wrapped on the stator core, the housing is disposed outside the stator core and the stator winding, and made of resin, the rotor is disposed in a cavity of the housing, a bearing housing is disposed at the center of the end cover and operates to receive the bearing, the bearing operates to support the rotating shaft, a flanging axially protrudes from an outer edge of the end cover, the flanging is received in the cavity and is fit with inner wall of the cavity whereby implementing radial locating, and enabling the bearing housing of the end cover to partially enter the cavity, multiple mounting feet protrude from the outer edge of the end cover, multiple connecting parts are disposed on outer end surface of the plastic package stator, and the mounting feet are fit with and connected to the connecting parts.

In a class of this embodiment, a mounting hole is disposed on the mounting feet.

In a class of this embodiment, a through hole is disposed at the connecting part and on the plastic package stator.

In a class of this embodiment, a bolt passes through the mounting hole and the through hole, and is fixed via a nut whereby mounting the end cover on the outer end surface of the plastic package stator.

In a class of this embodiment, the connecting part is a groove, and the mounting foot is received in the connecting part whereby aligning end surface of the end cover with that of the plastic package stator.

In a class of this embodiment, the end cover comprises a front end cover and a rear end cover, and the front end cover is connected to the rear end cover via the bolt and the nut.

In a class of this embodiment, the bearing is a porous bearing.

Advantages of the invention comprise: the motor features contact structure, and accurate locating during assembly between the end cover and the plastic package stator; particularly, the invention implements radial locating by the flanging extending from the outer edge of the end cover, received in the cavity of the plastic package stator, and fit with the inner wall of the cavity, whereby enabling the bearing housing of the end cover to partially enter the cavity, which affectively reduce the distance between the bearing housings on both ends of the motor, and improve accuracy of concentricity between the rolling bearings in the bearing housing, concentricity of outer diameters of the stator and the rotor, and consistency and stability of the motor.

DETAILED DESCRIPTION OF THE EMBODIMENTS

Further description of the invention will be given below in conjunction with specific embodiments and accompanying drawings.

Figure 1:
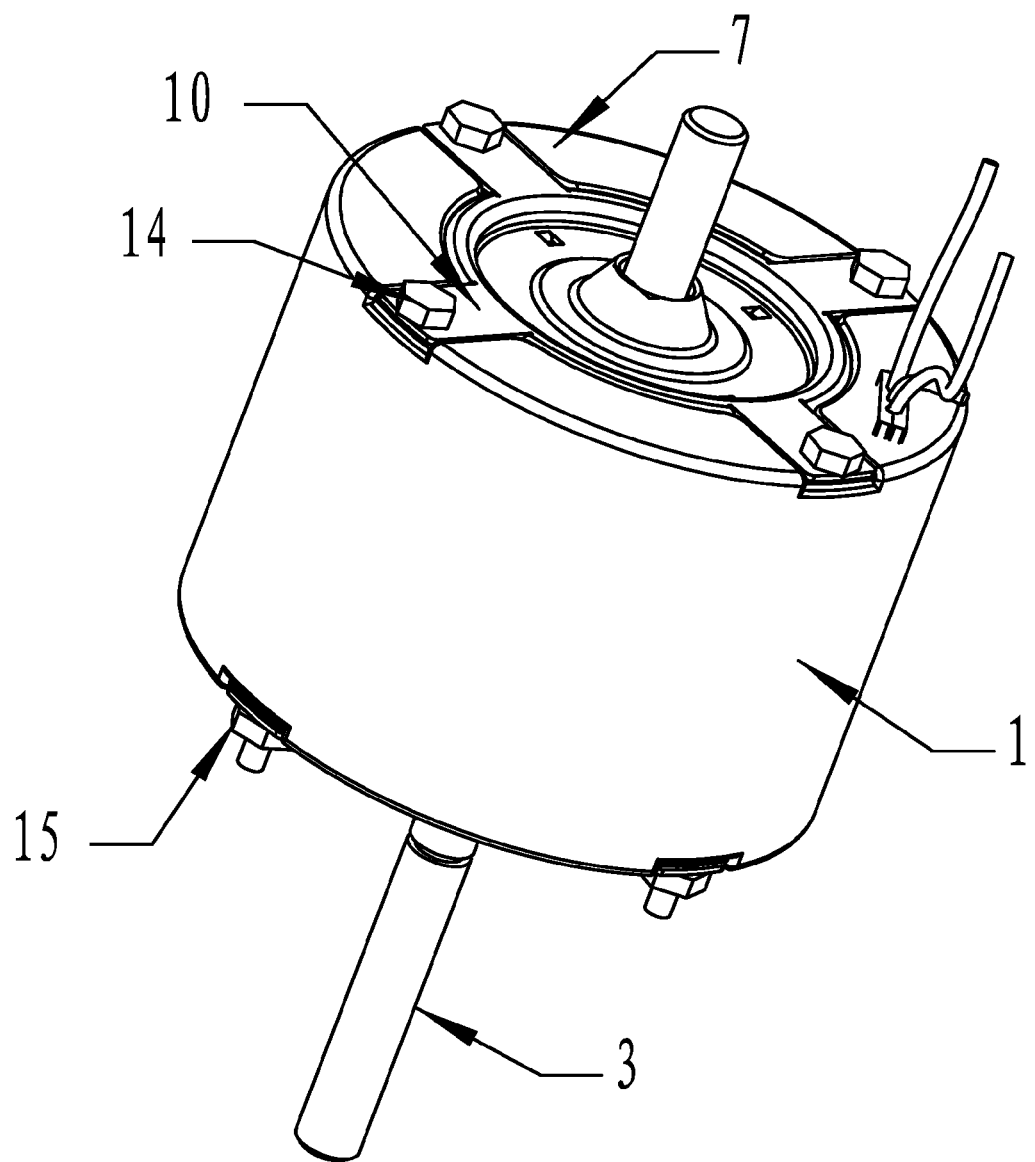
FIG. 1 is a schematic view of a plastic package motor of the invention.
Figure 2:
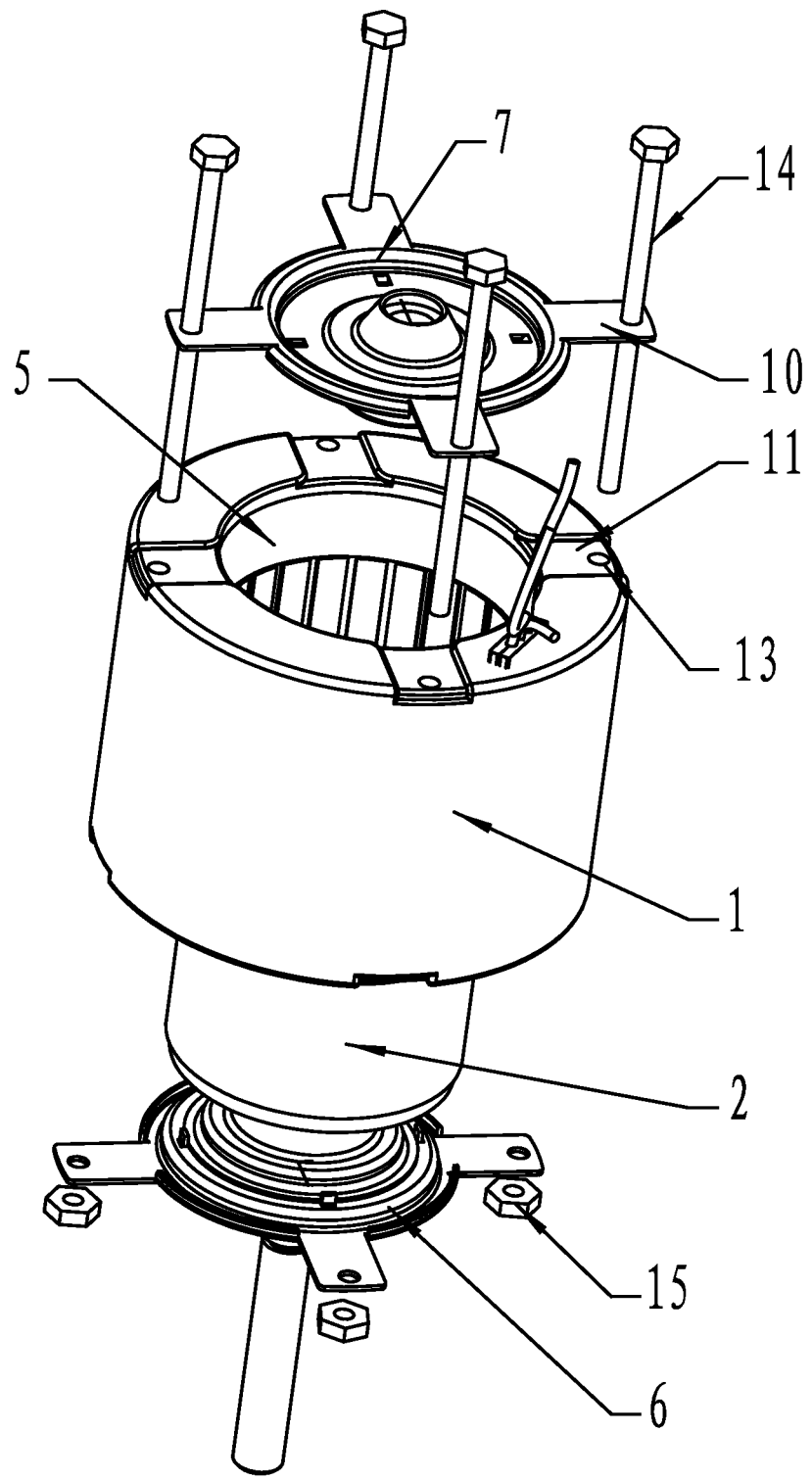
FIG. 2 is a partially exploded view of FIG. 1.
Figure 3:
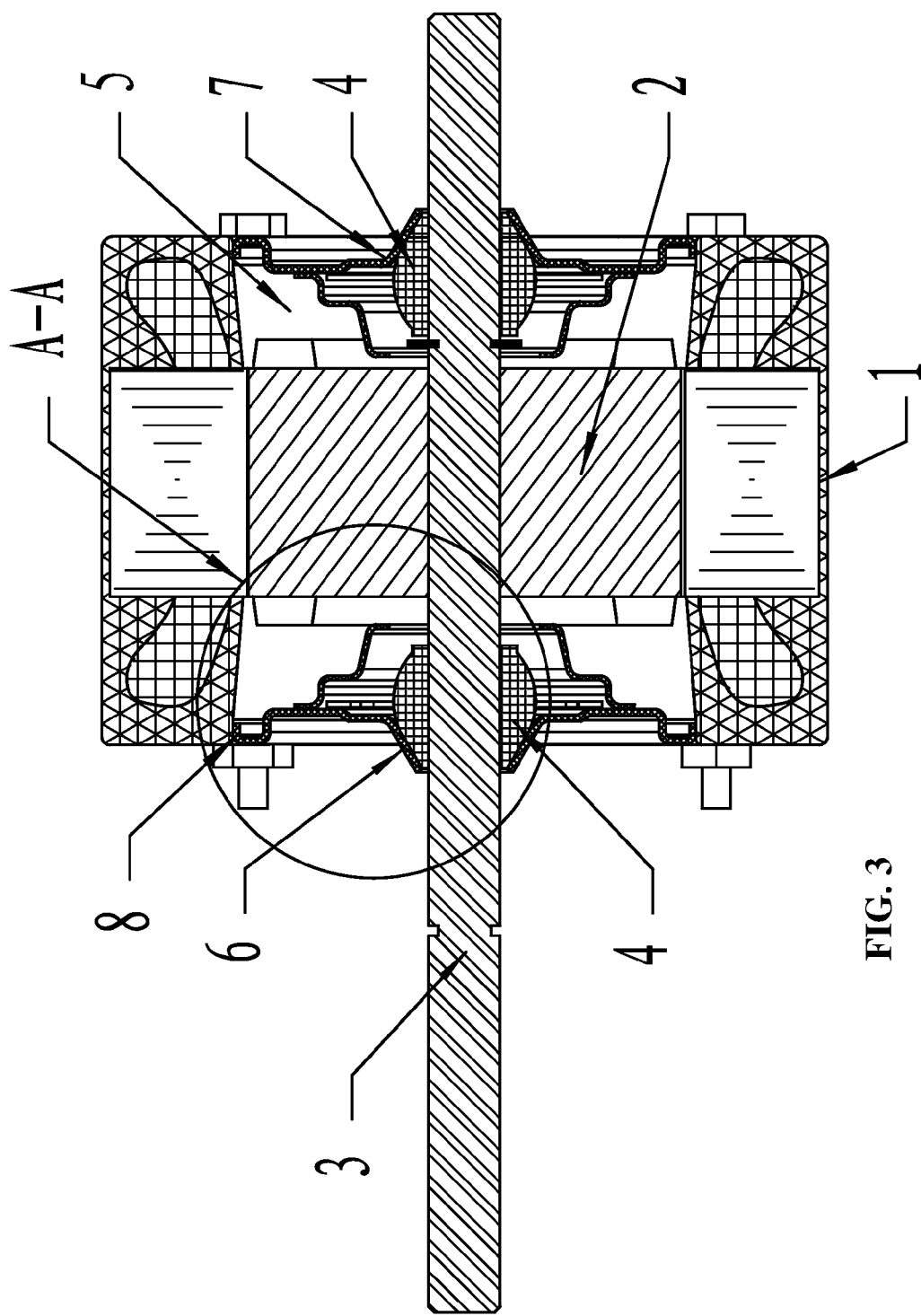
FIG. 3 is a half sectional view of a plastic package motor of the invention.
Figure 4:
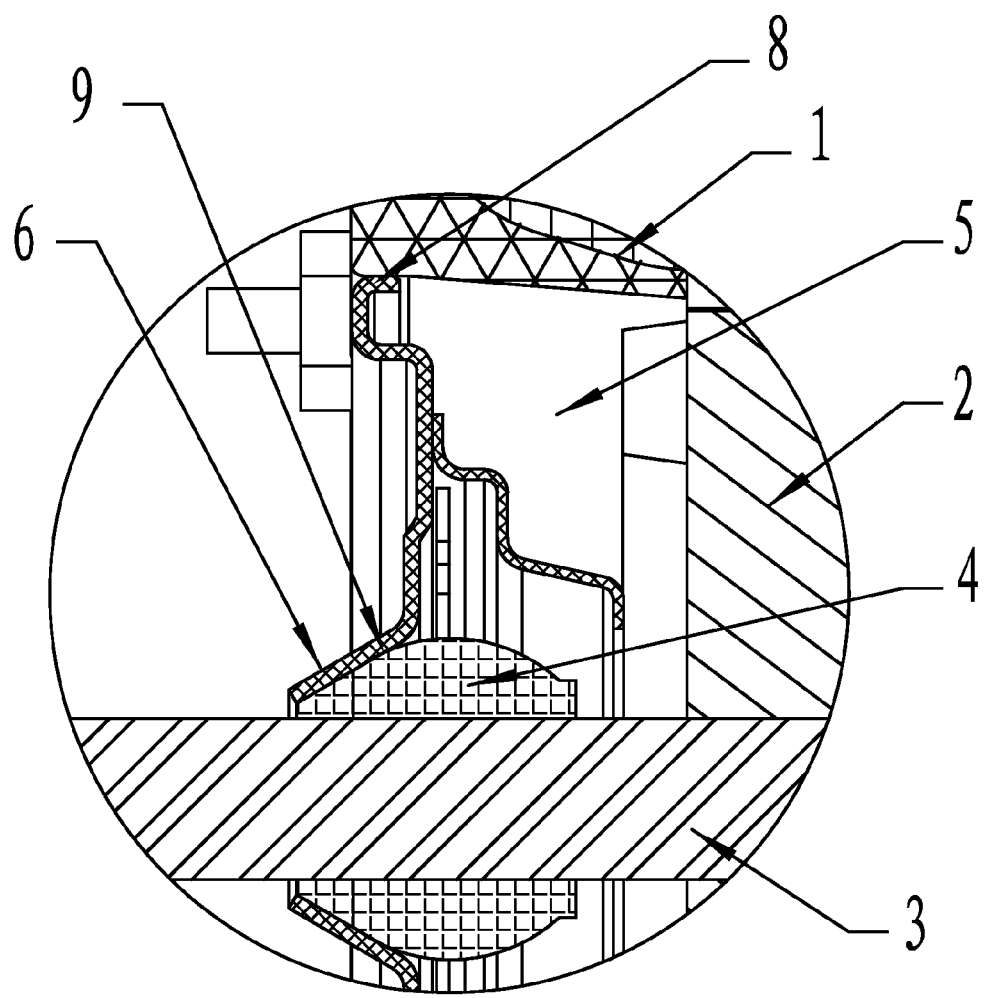
FIG. 4 is an enlarged view of FIG. 3 along an A-A line.
Figure 5:
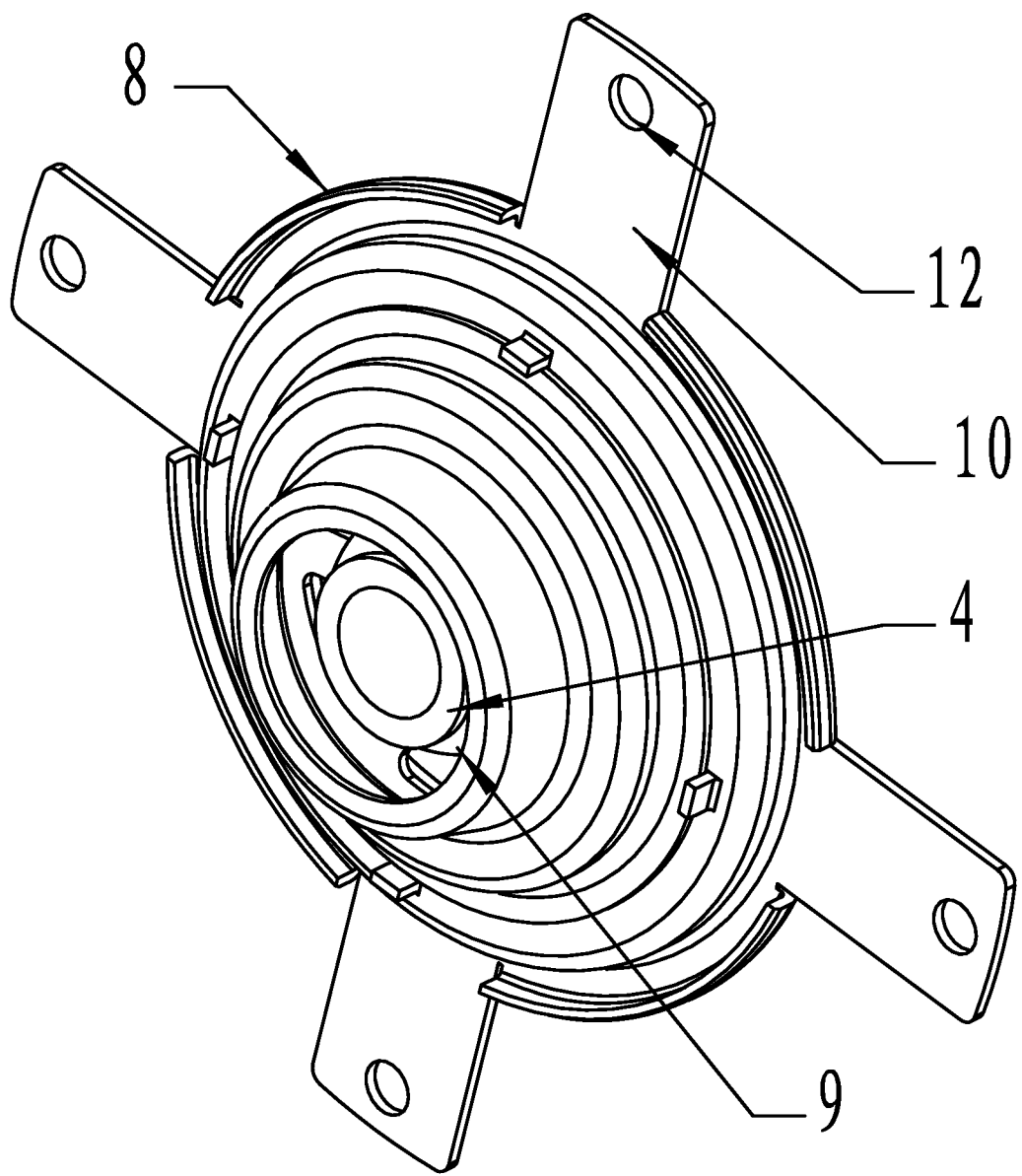
FIG. 5 is a solid view of an end cover of the invention.

As shown in FIGS. 1-5, a plastic package motor of the invention comprises a plastic package stator 1 comprising a stator core, a stator winding, and a housing, a rotor 2, a rotating shaft 3, a bearing 4, and at least one end cover. The stator winding is wrapped on the stator core, the housing is disposed outside the stator core and the stator winding, and made of resin, the rotor 2 is disposed in a cavity 5 of the housing, a bearing housing 9 is disposed at the center of the end cover and operates to receive the bearing 4, the bearing 4 operates to support the rotating shaft 3, a flanging 8 axially protrudes from an outer edge of the end cover, the flanging 8 is received in the cavity 5 and is fit with inner wall of the cavity 5 whereby implementing radial locating, and enabling the bearing housing 9 of the end cover to partially enter the cavity 5, multiple mounting feet 10 protrude from the outer edge of the end cover, multiple connecting parts 11 are disposed on outer end surface of the plastic package stator 1, and the mounting feet 10 are fit with and connected to the connecting parts 11. A mounting hole 12 is disposed on the mounting feet 10. A through hole 13 is disposed at the connecting part 11 and on the plastic package stator 1. A bolt 14 passes through the mounting hole 12 and the through hole 13, and is fixed via a nut 15 whereby mounting the end cover on the outer end surface of the plastic package stator 1. The connecting part 11 is a groove, and the mounting foot 10 is received in the connecting part 11 whereby aligning end surface of the end cover with that of the plastic package stator 1. The end cover comprises a front end cover 6 and a rear end cover 7, and the front end cover 6 is connected to the rear end cover 7 via the bolt 14 and the nut 15.

The bearing 4 is a porous bearing. The invention features contact structure, comparatively low cost, and long work life.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A plastic package motor, comprising:
a plastic package stator (1) comprising a stator core, a stator winding, and a housing;
a rotor (2);
a rotating shaft (3);
a bearing (4); and
at least one end cover; wherein
said stator winding is wrapped on said stator core;
said housing is disposed outside said stator core and said stator winding, and made of resin;
said rotor (2) is disposed in a cavity (5) of said housing;
a bearing housing (9) is disposed at the center of said end cover and operates to receive said bearing (4);
said bearing (4) operates to support said rotating shaft (3);
a flanging (8) axially protrudes from an outer edge of said end cover;
said flanging (8) is received in said cavity (5) and is fit with inner wall of said cavity (5) whereby implementing radial locating, and enabling said bearing housing (9) of said end cover to partially enter said cavity (5);
multiple mounting feet (10) protrude from said outer edge of said end cover;
multiple connecting parts (11) are disposed on outer end surface of said plastic package stator (1); and
said mounting feet (10) are fit with and connected to said connecting parts (11).

2. The plastic package motor of claim 1, wherein a mounting hole (12) is disposed on said mounting feet (10).

3. The plastic package motor of claim 2, wherein a through hole (13) is disposed at said connecting part (11) and on said plastic package stator (1).

4. The plastic package motor of claim 3, wherein a bolt (14) passes through said mounting hole (12) and said through hole (13), and is fixed via a nut (15) whereby mounting said end cover on said outer end surface of said plastic package stator (1).

5. The plastic package motor of claim 4, wherein
said connecting part (11) is a groove; and
said mounting foot (10) is received in said connecting part (11) whereby aligning end surface of said end cover with that of said plastic package stator (1).

6. The plastic package motor of claim 1, wherein
said end cover comprises a front end cover (6) and a rear end cover (7); and
said front end cover (6) is connected to said rear end cover (7) via said bolt (14) and said nut (15).

7. The plastic package motor of claim 1, wherein said bearing (4) is a porous bearing.

* * * * *